(12) United States Patent
Karjalainen et al.

(10) Patent No.: US 11,252,674 B2
(45) Date of Patent: Feb. 15, 2022

(54) METHODS AND APPARATUSES FOR MULTI-PANEL POWER CONTROL

(71) Applicant: Nokia Technologies Oy, Espoo (FI)

(72) Inventors: Juha Karjalainen, Oulu (FI); Kyoungmin Park, Yongin (KR); Sami Hakola, Kempele (FI); Jorma Kaikkonen, Oulu (FI); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/018,487

(22) Filed: Sep. 11, 2020

(65) Prior Publication Data
US 2021/0105725 A1    Apr. 8, 2021

Related U.S. Application Data

(60) Provisional application No. 62/910,788, filed on Oct. 4, 2019.

(51) Int. Cl.
*H04W 52/24*    (2009.01)
*H04W 52/14*    (2009.01)

(52) U.S. Cl.
CPC ....... *H04W 52/242* (2013.01); *H04W 52/146* (2013.01)

(58) Field of Classification Search
CPC ............. H04W 52/242; H04W 52/243; H04W 52/146
USPC ......................................... 455/522, 69, 67.11
See application file for complete search history.

(56) References Cited

U.S. PATENT DOCUMENTS

| 8,831,690 | B2 | 9/2014 | Perets et al. |
| 9,191,899 | B2 | 11/2015 | Kim et al. |
| 2012/0046046 | A1* | 2/2012 | Momiyama ........ G01C 21/3688 455/456.1 |
| 2019/0149379 | A1 | 5/2019 | Xiong et al. |
| 2019/0190747 | A1* | 6/2019 | Park ...................... H04W 52/32 |
| 2020/0059869 | A1* | 2/2020 | Kim ...................... H04W 52/36 |
| 2020/0229104 | A1* | 7/2020 | MolavianJazi ..... H04W 52/146 |

FOREIGN PATENT DOCUMENTS

| WO | 2017/146773 A1 | 8/2017 |
| WO | 2018/204340 A1 | 11/2018 |

OTHER PUBLICATIONS

"3rd Generation Partnership Project; Technical Specification Group Radio Access Network; NR; Physical layer procedures for control (Release 15)", 3GPP TS 38.213, V15.6.0, Jun. 2019, pp. 1-107.
"WI Proposal on NR MIMO Enhancements", 3GPP TSG RAN Meeting #80, RP-181453, Agenda: 9.1.1, Samsung, Jun. 11-14, 2018, 5 pages.
"3rd Generation Partnership Project; Technical Specification Group Radio Access Network; NR; Physical channels and modulation (Release 15)", 3GPP TS 38.211, V15.6.0, Jun. 2019, pp. 1-97.

(Continued)

*Primary Examiner* — John J Lee
(74) *Attorney, Agent, or Firm* — Squire Patton Boggs (US) LLP (57) ABSTRACT

Systems, methods, apparatuses, and computer program products for multi-antenna panel transmission power control are provided.

20 Claims, 4 Drawing Sheets (56) References Cited

OTHER PUBLICATIONS

"3rd Generation Partnership Project; Technical Specification Group Radio Access Network; NR; Multiplexing and channel coding (Release 15)", 3GPP TS 38.212, V15.6.0, Jun. 2019, pp. 1-101.
"3rd Generation Partnership Project; Technical Specification Group Radio Access Network; NR; Physical layer procedures for data (Release 15)", 3GPP TS 38.214, V15.6.0, Jun. 2019, pp. 1-105.
"3rd Generation Partnership Project; Technical Specification Group Radio Access Network; NR; Physical layer measurements (Release 15)", 3GPP TS 38.215, V15.5.0, Jun. 2019, pp. 1-16.
"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.
"Discussion on UL power control for multi-panel operation", 3GPP TSG RAN WG1 Meeting #96bis, R1-1904027, Agenda: 7.2.8.6, ZTE, Apr. 8-12, 2019, 3 pages.
Extended European Search Report received for corresponding European Patent Application No. 20198025.7, dated Feb. 24, 2021, 9 pages.
"Feature lead summary#4 of Enhancements on Multi-beam Operations", 3GPP TSG RAN WG1 Meeting #98, R1-1909779, Agenda item: 7.2.8.3, LG Electronics, Aug. 26-30, 2019, 38 pages.
"Initial simulation results for UL multi panel transmission", 3GPP TSG-RAN WG1 Meeting #95, R1-1813607, Agenda Item: 7.2.8.6, Ericsson, Nov. 12-16, 2018, 6 pages.

\* cited by examiner

METHODS AND APPARATUSES FOR MULTI-PANEL POWER CONTROL

CROSS REFERENCE TO RELATED APPLICATIONS

This application claims priority from U.S. Provisional Application No. 62/910,788, filed on Oct. 4, 2019. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for multi-antenna panel transmission power control.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein.

SUMMARY

According some aspects, there is provided the subject matter of the independent claims. Some further aspects are defined in the dependent claims. The embodiments that do not fall under the scope of the claims are to be interpreted as examples useful for understanding the disclosure.

In a first aspect thereof the exemplary embodiments of this invention provide a method that comprising receiving, by a user equipment, at least one signal for performing inter-antenna panel pathloss power measurements; computing an initial uplink transmission power control value for a target uplink resource without any interference information; computing pathloss power differences between the target uplink resource and candidate interference resources using the pathloss power measurements; and using the pathloss power differences to identify a dominant uplink interferer by computing maximum estimated pathloss power differences.

In a further aspect thereof the exemplary embodiments of this invention provide an apparatus that comprises at least one memory comprising computer program code; at least one processor; wherein the at least one memory and the computer program code are configured, with the at least one processor, to cause the apparatus at least to receive, by the apparatus, at least one signal for performing inter-antenna panel pathloss power measurements; compute an initial uplink transmission power control value for a target uplink resource without any interference information;
compute pathloss power differences between the target uplink resource and candidate interference resources using the pathloss power measurements; and use the pathloss power differences to identify a dominant uplink interferer by computing maximum estimated pathloss power differences.

In another aspect thereof the exemplary embodiments of this invention provide a non-transitory computer readable medium comprising program instructions stored thereon for performing at least: receiving, by a user equipment, at least one signal for performing inter-antenna panel pathloss power measurements; computing an initial uplink transmission power control value for a target uplink resource without any interference information; computing pathloss power differences between the target uplink resource and candidate interference resources using the pathloss power measurements; and using the pathloss power differences to identify a dominant uplink interferer by computing maximum estimated pathloss power differences.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for multi-antenna panel transmission power control, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments described here may relate to 3$^{rd}$ generation partnership project (3GPP) NR physical layer design for multiple input multiple output (MIMO) enhancements in Release-16 and beyond. More specifically, some embodiments provide enhanced UE procedures and signalling mechanisms for uplink multi-antenna panel transmission power control with multiple transmission point(s) (TRPS), as well as sidelink UEs equipped with multiple antenna panels.

NR Release-15 is assumed to operate with beam based operation, at both below and above 6 GHz carrier frequency range, where both transmitter and receiver use spatial domain beamforming (e.g., in analog or digital domain) at transmission (TX) and/or reception (RX) to cover a propagation loss associated with a radio channel. Furthermore, it is assumed that UEs are equipped with multiple TX and RX antenna panels associated with multiple antenna elements. Depending on UE capability, a set of UE antenna panels can be simultaneously used for transmission and reception.

Release-15 also provides support for uplink (UL) TX beam specific power control schemes. In Release-15, UL power control (PC) aims to control the transmission power of different UEs associated with different UL channels, reference signals and signals that relative power differences of received uplink signals are sufficiently small with respect to each other's, thereby enabling proper reception of data/channel/reference signal/signal information. Furthermore, the UL transmission power control can be used to control inter-cell interference among neighboring cells. Release-15 provides support for both open-loop and inner-loop UL TX power control schemes. For the open-loop scheme, UL TX power is adjusted to cover pathloss associated with downlink reference signal, i.e., non-zero power channel state information reference signal (NZP-CSI-RS) based pathloss measurements. For the inner-loop power control approach, in addition to the open loop scheme, gNB performs uplink measurements and transmits explicit TX power control commands to UE to adjust the UL TX power.

Furthermore, NR Release-15 supports UL power control for physical uplink shared channel (PUSCH), physical uplink control channel (PUCCH), sounding reference signal (SRS), and physical random access channel (PRACH) transmissions. According to 3GPP technical specification (TS 38.213), NR Release-15 UE determines the PUSCH transmission, power $P_{PUSCH}(i)$, in PUSCH transmission occasion i, as:

$$P_{PUSCH}(i) = \min \left\{ \begin{array}{c} P_{CMAX}(i), \\ P_{O\_PUSCH}(j) + 10\log_{10}(2^{\mu} \cdot M_{RB}^{PUSCH}(i)) + \\ \alpha(j) \cdot PL(q_d) + \Delta_{TF}(i) + f(i) \end{array} \right\}$$

where $P_{PUSCH}$ is the PUSCH transmit power, $P_{CMAX}$ is the maximum allowed transmit power per carrier, $P_{O\_PUSCH}(\ )$ is a network-configurable parameter that is considered as a target received power, PL ($q_d$) is an estimate of the uplink pathloss, α (j) is a network-configurable parameter related to fractional path-loss compensation, μ relates to the subcarrier spacing, $\Delta f = 2^{\mu} \times 15$ KHz, used for the PUSCH transmission, $M_{RB}$ is the number of resource blocks assigned for the PUSCH transmission, $\Delta_{TF}$ relates to the modulation scheme and channel-coding rate used for the PUSCH transmission, and f(i) is the power adjustment due to the closed-loop power control. It is noted that same method can also be applied to PUCCH, PRACH, SRS.

It has been agreed, in 3GPP, that a unified forward compatible solution covering both single panel and simultaneous multi-panel UE transmission needs to be specified during 3GPP Release-16. Therefore, there is a need to develop enhanced UE procedures and signalling mechanisms to enable UL TX power control for simultaneous multi-antenna panel UL transmission.

Figure 1:
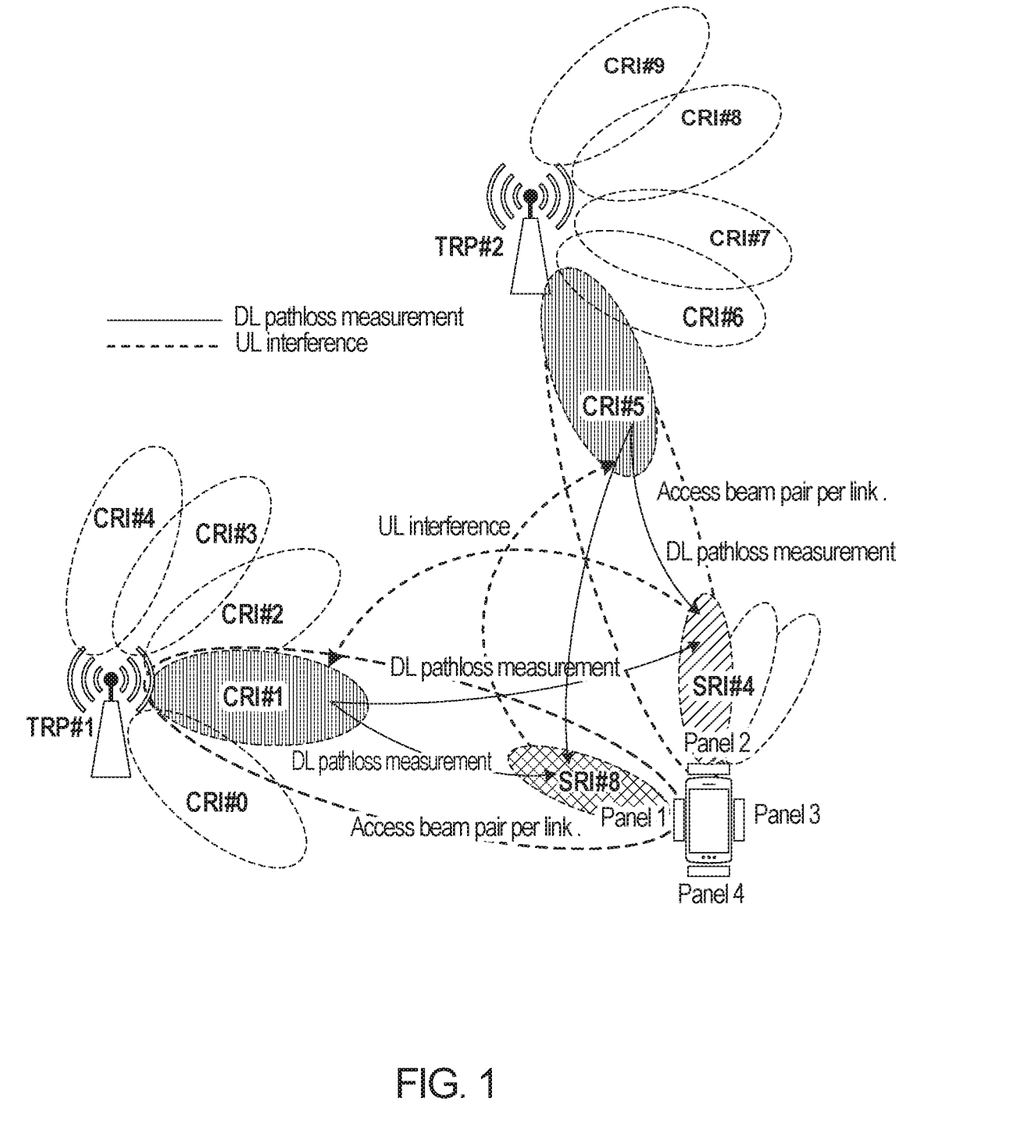
FIG. 1 illustrates an example of interference originated from simultaneous uplink (UL) multi-panel transmissions with multiple TRPs with beam based operation in NR.

FIG. 1 illustrates an example of interference originated from simultaneous UL multi-panel transmissions with multiple TRPs with beam based operation in NR. More specifically, the example of FIG. 1 illustrates an example of the UL interference problem caused by simultaneous uplink multi-panel transmission, e.g., PUSCH/PUCCH or any other uplink channel/signal/reference signal, with two TRPs. This scenario can occur when same data/control/RS/signal is simultaneously transmitted over multiple antenna panels to improve robustness of URLLC. The UE is assumed to have a capability to transmit simultaneously uplink reference signals/control/data/signal, e.g., SRS/PUCCH/PUSCH/PRACH, with multiple antenna panels to different TRPs. Furthermore, it is assumed that a beam correspondence, i.e., downlink (DL) RX beam used as UL TX beam, is applied at both the UE and gNB/TRP. Here, it is assumed that each DL TX beam is associated with NZP-CSI-RS resources with channel state information (CSI) resource ID (CRI). Similarly, each UL TX beam is associated with UL SRS resource with resource ID (SRI).

According to Release-15 uplink beam-specific open-loop power control, a UE is configured to perform downlink pathloss measurements based on downlink NZP CSI-RS resources, e.g., CRI #1 from TRP #1 and CRI #5 from TRP #2, as illustrated in FIG. 1. These pathloss measurements are assumed to capture also RX/TX beam forming gain in addition to pathloss. In the example of FIG. 1, it may be assumed that SRS resources SRI #4 and SRI #8 are used as spatial source for UL demodulation reference signal (DMRS) of PUSCH transmission. Based on the pathloss measurements, the UE is able to compute power control values separately for each UL PUSCH TX beam, i.e., SRI #8 for antenna panel #1 and SRI #4 for antenna panel #2. As a result of simultaneous PUSCH transmission, a UL interference problem may arise in the PUSCH reception at TRP 1 and TRP 2.

The reason for the above uplink interference problem is that Release-15 uplink beam specific power control does not take into account pathloss measurements between different UE antenna panels used for simultaneous multi-panel transmission. For instance, in the example of FIG. 1, if a pathloss estimate for the beam-pair CRI #1-SRI #4 is larger (i.e., smaller attenuation) when compared with the pathloss estimate of the beam-pair CRI #5-SRI #4, then the transmission power of PUSCH associated with the beam-pair SRI #4-CRI #5 can cause interference for the reception of PUSCH associated with the beam-pair SRI #8-CRI #1 at TRP #1 receiver. It is possible that UL interference causes analog-to-digital converter (ADC) at TRP #1 to saturate and disables the reception of UL transmissions, e.g., DMRS, or any other RS/signal/channel. It is noted that the same problem can also arise when two or more sidelink UEs communicate with each other and use simultaneous uplink multi-panel transmission. Naturally, the severity of UL interference at the receiver of TRP #1, caused by power control of the beam-pair SRI #4-CRI #5, may depend on UL power control associated with the beam-pair SRI #8-CRI #1.

As discussed above, the existing NR Release-15 UL TX beam specific power control solution may lead to severe uplink interference problems when simultaneous multi-panel UL transmission is used. The interference may significantly limit system performance in UL with multiple TRPs or sidelink UEs. To mitigate the aforementioned interference power leakage problem in uplink in Release-16 and beyond, physical layer UE procedures need to be enhanced for the UL multi-panel transmission power control. Furthermore, new signalling mechanisms and new pathloss measurements related to uplink power control need to be developed. Until now, the UL multi-panel transmission power control for simultaneous multi-antenna panel transmission has not been addressed.

Certain embodiments may provide physical layer procedures for UE uplink power control at least to mitigate uplink interference caused by simultaneous uplink multi-panel transmission with multiple TRPs and/or sidelink UEs. In order to identify potential uplink interference caused by simultaneous uplink multi-antenna panel transmission, an embodiment may include defining a UE inter-antenna-panel pathloss power difference measurement procedure between configured DL resources associated with UL resources at UE-side. Another embodiment may include defining an inter-antenna panel interference-aware UL TX power control procedure for simultaneous multi-antenna panel transmission. By using inter-antenna panel pathloss power difference measurements, potential UL interference is taken into account when UL TX power is determined for simultaneous UL multi-antenna panel transmission.

In one embodiment, to identify potential uplink interference caused by simultaneous uplink multi-antenna panel transmission, UE inter-antenna panel pathloss power measurement procedure between configured DL resources associated with UL resources at UE-side is defined. In this measurement procedure, downlink pathloss measurements between different antenna panels may be used to estimate potential uplink interference at TRPs/gNBs/sidelink UEs without any additional signaling information.

In an embodiment, the measurement procedure may include that each configured uplink resource associated with TX-RX beam-pair and its corresponding downlink resource is considered as a target resource one at the time. At the same time, the rest of uplink resources and their corresponding downlink resources are considered as interference leakage resources. Received reference signal powers may be measured from the target resources and interference leakage resources. When interference leakage resources are used for the measurements at UE, the measurements are computed by using same spatial source (QCL-type D) as the target resource. Then, by knowing transmission power of target and interference resources the corresponding pathloss estimates may be computed. By using the computed pathloss estimates, a UE may compute pathloss power differences between target and candidate interference resources by subtracting the pathloss estimate of the target resource from the pathloss estimate of a potential interference resource as follows: $d_{(k,i)}=PL_i-PL_k$, where $PL_k$ and $PL_i$ are pathloss power measurements for k-th target and i-th Interference leakage resource (k≠i).

In one embodiment, an inter-antenna panel interference-aware UE procedure for TX power control for simultaneous UL multi-panel transmission may be defined. In this embodiment, upon the reception of indication information via physical and/or MAC and/or RRC signaling on the use of uplink resources for simultaneous multi-panel transmission, a network node (e.g., UE, sidelink UE) may determine its UL TX power control values for UL-DL beam pairs associated with UL resources for simultaneous UL transmission according to at least the following steps. Initially, a UE may determine initial UL TX power control value, $P_k$, for a target UL resource according to NR Release-15 UL TX power control, as defined in the foregoing. To identify a dominant UL interferer, the UE may compute the maximum estimated pathloss power differences for the k-th target resource selected as:

$$\Delta_k = \text{Max}\{d_{(k,1)}, d_{(k,2)}, \ldots, d_{(k,I)}\},$$

where the parameter I=K−1 and the parameter K defines the number of resources configured for simultaneous UL transmission. The maximum value corresponds the beam-pair that may cause interference for uplink reception.

Based on the maximum estimated pathloss difference, the UE may determine the need for decreasing or increasing of the initial UL TX power value. When the value of maximum estimated pathloss power difference is larger than zero (i.e., If ($\Delta_k>0$)), initial UL TX power is decreased by the value of the maximum estimated pathloss difference (i.e., $P_k=P_k-\Delta_k$). As a result, uplink interference caused by a target uplink resource can be mitigated.

When the computed the value of maximum estimated pathloss power difference is less or equal to zero and total aggregated (=sum) transmission power over different resources is less than the UE TX power budget (PcTot) per TX antenna panel or over all TX antenna panels depending on implementation (i.e., else if ($\Delta_k \leq 0$ and ($\Sigma P_k < \text{PcTot}, \forall k$))), the UE increases its TX UL power for the k-th target resource. The UE may compute TX power increase in two steps: the UE selects firstly minimum value out of absolute of maximum pathloss difference value and network configured uplink TX power boost value ($\Delta^{network}_k \geq 0$); then, the actual UE power control value is selected by taking minimum among power increase of initial power and the total UL TX power budget. These operations may be mathematically summarized as follows:

else if ($\Delta k \leq 0$ and ($\Sigma P_k < \text{PcTot}, \forall k$)), $$\Delta^{new}_k = \min(\text{abs}(\Delta_k)), \Delta^{network}_k),$$

$$P_k = \min(P_k + \Delta^{new}_k, \text{PcTot}),$$

By using the above UL TX power increase procedure, the network is able to control the value of TX power boost such that UL interference is minimized. Furthermore, it can be guaranteed that UL TX power budget is not exceeded. Otherwise, the initial UL TX power control value, $P_k$, may be used.

Figure 2:
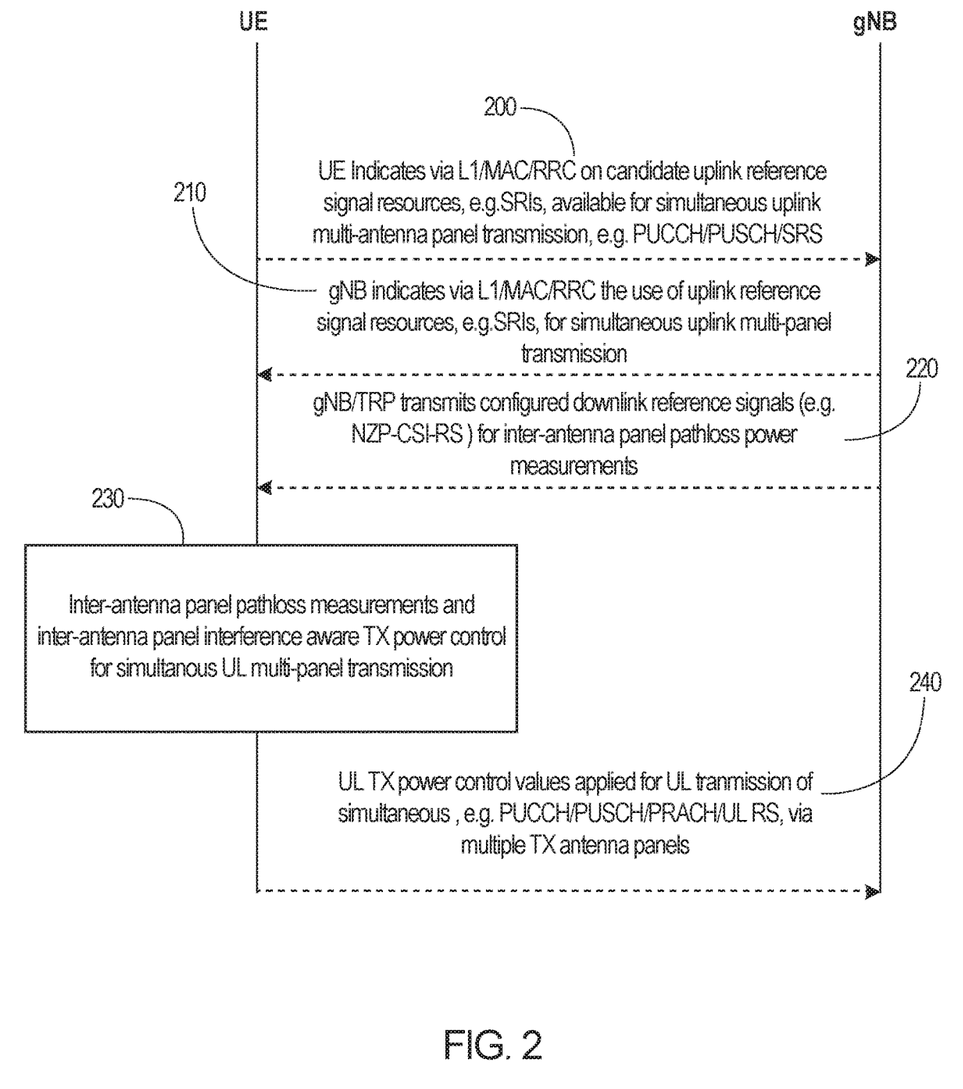
FIG. 2 illustrates an example signaling diagram of a power control method with simultaneous multi-panel transmission, according to an embodiment.

FIG. 2 illustrates an example signaling diagram of the information exchange between a UE and gNB for a power control method with simultaneous multi-panel transmission, according to an embodiment. As illustrated in the example of FIG. 2, at 200, the UE may provide an indication to a network node (e.g. gNB/TRP or sidelink UE) about candidate uplink resources that can be used for simultaneous uplink multi-panel transmission of reference signal(s)/signal(s)/data channel(s)/control channel(s). In an embodiment, the indicated candidate uplink resources may be associated with UE TX antenna panels at UE side implementation specifically without any explicit signalling information from a network. According to an example embodiment, the indication of the candidate resources to the network or another sidelink UE, at 200, may be done via physical layer signalling, e.g., sequence IDs or resource IDs (e.g. SRIs), resource set IDs associated with UL RS/signals via PUCCH w/UCI, MAC control element (CE) as part of PUSCH, RRC level indication, and/or any combination of physical layer or MAC or RRC level signalling. Alternatively, for sidelink communication with or without network assistance, the UE can also send UL RSs with pre-configured resources associated with limited set of sequence IDs to indicate to another sidelink UE about candidate UL resources.

At 210, the network may indicates to the UE to use a set of configured uplink resources for simultaneous uplink multi-panel transmissions. In an embodiment, the provided information may include at least one of the following elements: sequence IDs associated with UL reference signals (e.g. SRS and/or PRACH preamble), set of SRIs or multiple SRS resource sets as part of DCI payload (PDCCH), set of SRIs and/or multiple SRS resource sets as part of MAC CE (PDSCH). For example, the resource indication mechanism can be implemented via physical layer signaling, e.g. PDCCH DCI or PUCCH w/UCI (sidelink UEs with or without network assistance) or UL RS associated with sequence IDs and resources (sidelink UEs with or without network assistance) or MAC control element (CE) indication, e.g., MAC CE as part of PDSCH/PUSCH or RRC level indication (e.g., separate parameter, number_Of_simultanous_uplink_RS_resources, defining the number of simultaneously transmitted uplink resources), or any combination of physical layer or MAC or RRC level signalling.

At 220, the network may transmit downlink reference signals (e.g., NZP-CSI-RS) to enable inter-antenna panel pathloss measurements at the UE-side. Alternatively, in an embodiment, for sidelink communication, another sidelink UE can be configured to send out uplink RS to enable (sidelink) UE to perform inter-antenna panel pathloss measurements.

At 230, to identify potential uplink interference caused by simultaneous uplink multi-antenna panel transmission, UE inter-antenna panel pathloss power measurement procedure between configured DL resources associated with UL resources may be performed at the UE-side. Based on DL/UL RS and/or signal (e.g., NZP-CSI-RS/SRS/SSB/PRACH preamble) transmission from gNB/sidelink UE, the UE may compute received reference signal powers of configured reference signals. Each configured uplink resource associated with TX-RX beam-pair and its corresponding downlink resource may be considered as a target resource one at the time. At the same time, the rest of uplink resources and their corresponding downlink resources may be considered as interference leakage resources. The received reference signal power may be measured from target resources and interference leakage resources. When the interference leakage resources are used for the measurements, the measurements may be computed by using same spatial source (QCL-type D) as the target resource. By knowing transmission powers of the configured resources, the corresponding pathloss estimates can also be computed at the UE. As a result of inter-antenna-panel pathloss measurements, the UE can determine interference-aware UL TX power values for simultaneous uplink multi-panel transmission. Further details of the interference-aware uplink TX power control procedure are provided in connection with FIG. 3 discussed below.

Continuing with the example of FIG. 2, at 240, the UE may transmit simultaneously uplink RSs/PUSCH/PUCCH with computed power control values via multiple antenna panels for gNB/TRP or another sidelink UE.

Figure 3:
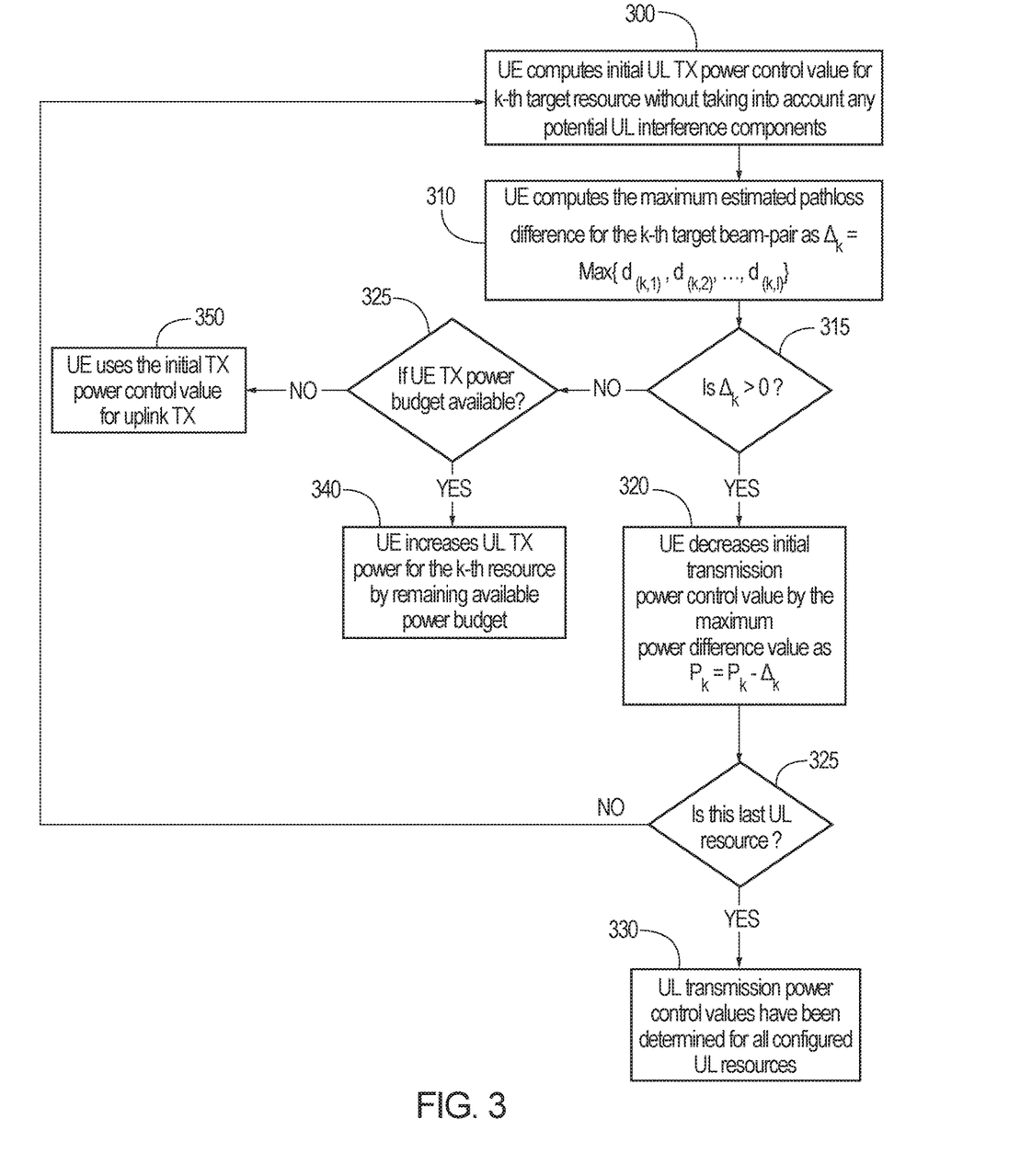
FIG. 3 illustrates an example flow diagram of a method for an interference-aware UL power control, according to an embodiment.

FIG. 3 illustrates an example flow diagram of a method for an interference-aware UL power control for simultaneous PUSCH/PUCCH/PRACH preamble/UL RS transmission over multiple antenna panels, according to an embodiment. In one example, the procedures depicted in FIG. 3 may be performed by a UE. Here, it is assumed that UE has performed inter-antenna panel pathloss measurements.

As illustrated in the example of FIG. 3, at 300, the method may include the UE computing initial UL TX power control value, $P_k$, for a target UL resource without any interference information according to NR Release-15 UL TX power control. Then, by using the computed pathloss estimates, the method may include the UE computing pathloss power differences between target and candidate interference resources by subtracting the pathloss estimate of the target resource from the pathloss estimate of potential interference resource, e.g., as follows: $d_{(k,i)} = PL_i - PL_k$ where, $PL_k$ and $PL_i$ are pathloss power measurements for the k-th target and the i-th Interference leakage resource ($k \neq i$).

Subsequently, by using the pathloss power differences, the UE can identify a dominant UL interferer by computing, at 310, the maximum estimated pathloss power differences for the k-th target resource selected as: $\Delta_k = \text{Max}\{d_{(k,1)}, d_{(k,2)}, \ldots, d_{(k,I)}\}$, where the parameter I=K−1 and the parameter K defines the number of resources configured for simultaneous UL transmission. The maximum value corresponds to the beam-pair that may cause interference for the uplink reception.

Then, based on the maximum estimated pathloss difference, the UE may determine the need for decreasing or increasing of the initial UL TX power value. For example, when the value of the maximum estimated pathloss power difference is larger than zero, initial UL TX power may be decreased by the value of the maximum estimated pathloss difference. If it is determined, at 315, that the value of the power difference is larger than zero, i.e. $\Delta_k > 0$, then the method may include, at 320, decreasing transmission power control value by the maximum power difference value as $P_k = P_k - \Delta_k$. As a result, uplink interference caused by the transmission of the target uplink resource can be mitigated.

When it is determined, at 315, that the computed the value of maximum estimated pathloss power difference is less or equal to zero and, at 325, that total aggregated (=sum) transmission power over different resources is less than the UE TX power budget (PcTot) per TX antenna panel or over all TX antenna panels depending on implementation (e.g., UE has TX power budget available), then the method may include, at 340, the UE increasing its TX UL power for the k-th target resource. In an embodiment, the UE may compute the TX power increase by first selecting the minimum value out of the absolute of maximum pathloss difference value and network configured uplink TX power boost value ($\Delta^{network}_k \geq 0$). After this, an actual UE power control value may be selected by taking minimum among power increase of the initial power value and the total UL TX power budget. This operation may be mathematically summarized as follows: if ($\Delta_k \leq 0$ and ($\Sigma P_k < \text{PcTot}, \forall k$)), then $\Delta^{new}_k = \min(\text{abs}(\Delta_k))$, $\Delta^{network}_k$, and $P_k = \min(P_k + \Delta^{new}_k, \text{PcTot})$.

If the maximum estimated pathloss power difference is less or equal to zero and total aggregated (=sum) transmission power over different resources larger than the UE power budget, at 350, the method may include the UE using the initial TX power control value.

At 325, the method may include determining if this is the last UL resource, as the method of FIG. 3 may be repeated for all targeted resources. If it is determined at 325 that it is the last UL resource then, at 330, it is concluded that UL power control values have been determined for all configured UL resources and the computed power control values can be applied for resources configured for simultaneous uplink transmission over multiple antenna panels. As a result, uplink interference at gNB/TRP/sidelink UE receiver caused by simultaneous uplink multi-panel transmission can be minimized.

Figure 4A:
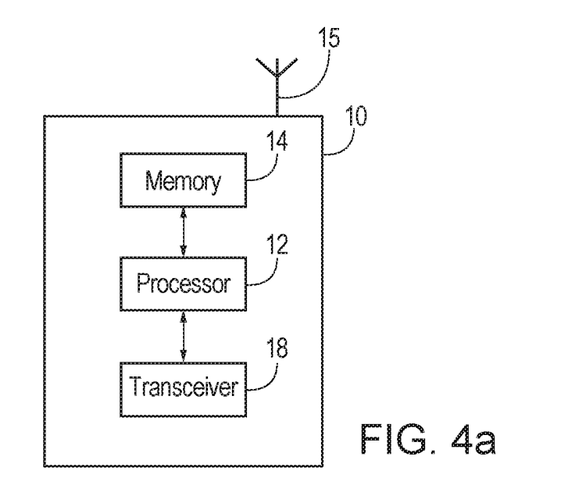
FIG. 4a illustrates an example block diagram of an apparatus, according to an embodiment.

FIG. 4a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the example embodiments described herein, such as the flow or signaling diagrams illustrated in FIG. 2 or 3. In some embodiments, apparatus 10 may be configured to perform a procedure for interference-aware UL power control for simultaneous UL multi-panel transmission, for example. In an embodiment, apparatus 10 may represent a network node, such as a gNB or NG-RAN node.

In an embodiment, apparatus 10 may be controlled by memory 14 and processor 12 to receive, from a UE, an indication of candidate uplink resources that can used for simultaneous uplink multi-panel transmission of signal(s), reference signal(s), data channel(s), and/or control channel(s). In an embodiment, the indicated candidate uplink resources may be associated with UE TX antenna panels at the UE side. According to one embodiment, the indication of the candidate resources may be received via physical layer signalling, e.g., sequence IDs or resource IDs (e.g. SRIs), resource set IDs associated with UL RS/signals via PUCCH w/UCI, MAC control element (CE) as part of PUSCH, RRC level indication, or any combination of physical layer or MAC or RRC level signalling.

According to certain embodiments, apparatus 10 may be controlled by memory 14 and processor 12 to indicate to the UE to use a set of configured uplink resources for simultaneous uplink multi-panel transmissions. In an embodiment, the set of configured uplink resources may include at least one of the following elements: sequence IDs associated with UL reference signals (e.g. SRS and/or PRACH preamble), set of SRIs or multiple SRS resource sets as part of DCI payload (PDCCH), set of SRIs and/or multiple SRS resource sets as part of MAC CE (PDSCH). For example, apparatus 10 may be controlled by memory 14 and processor 12 to indicate the set of configured uplink resources via physical layer signaling, such as PDCCH DCI or PUCCH with UCI, UL RS associated with sequence IDs and resources, MAC control element (CE) indication, or any combination of physical layer or MAC or RRC level signalling.

In an embodiment, apparatus 10 may be controlled by memory 14 and processor 12 to transmit, to the UE, downlink reference signals (e.g., NZP-CSI-RS) to enable inter-antenna panel pathloss measurements at the UE-side. According to one embodiment, apparatus 10 may be controlled by memory 14 and processor 12 to receive, from the UE, simultaneously uplink RSs/PUSCH/PUCCH with computed power control values via multiple antenna panels.

Figure 4B:
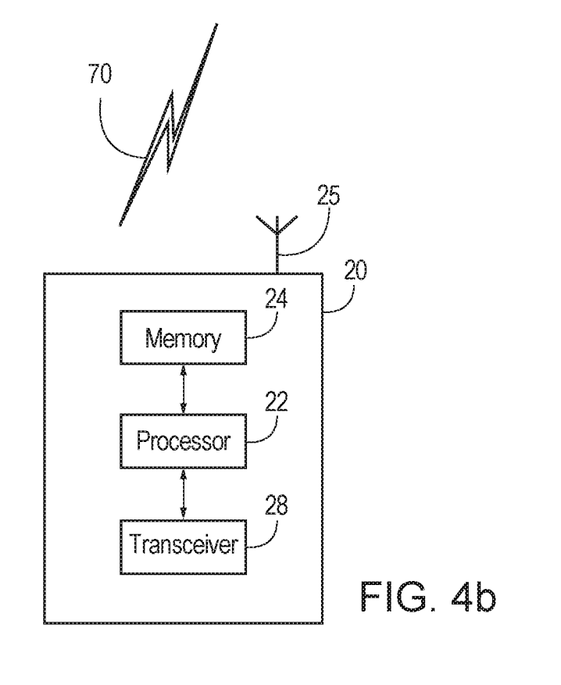
FIG. 4b illustrates an example block diagram of an apparatus, according to an embodiment.

FIG. 4*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4*b*.

As illustrated in the example of FIG. 4*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 2 or 3. In certain embodiments, apparatus 20 may include or represent a UE and may be configured to perform a procedure relating to interference-aware UL power control for simultaneous UL multi-panel transmission, for instance.

In certain embodiments, apparatus 20 may be controlled by memory 24 and processor 22 to transmit, to a network node, an indication of candidate uplink resources that can be used for simultaneous uplink multi-panel transmission of signal(s), reference signal(s), data channel(s), and/or control channel(s). In an embodiment, the indicated candidate uplink resources may be associated with UE TX antenna panels at the apparatus 20. According to one embodiment, the indication of the candidate resources may be transmitted via physical layer signalling, e.g., sequence IDs or resource IDs (e.g. SRIs), resource set IDs associated with UL RS/signals via PUCCH w/UCI, MAC control element (CE) as part of PUSCH, RRC level indication, or any combination of physical layer or MAC or RRC level signalling. Alternatively, for sidelink communication with or without network assistance, apparatus 20 may be controlled by memory 24 and processor 22 to send UL RSs with pre-configured resources associated with limited set of sequence IDs to indicate to another sidelink UE about candidate UL resources.

According to certain embodiments, apparatus 20 may be controlled by memory 24 and processor 22 to receive, from the network node, an indication to use a set of configured uplink resources for simultaneous uplink multi-panel transmissions. In an embodiment, the set of configured uplink resources may include at least one of the following elements: sequence IDs associated with UL reference signals (e.g. SRS and/or PRACH preamble), set of SRIs or multiple SRS resource sets as part of DCI payload (PDCCH), set of SRIs and/or multiple SRS resource sets as part of MAC CE (PDSCH). For example, apparatus 20 may be controlled by memory 24 and processor 22 to receive the set of configured uplink resources via physical layer signaling, such as PDCCH DCI or PUCCH with UCI, UL RS associated with sequence IDs and resources, MAC control element (CE) indication, or any combination of physical layer or MAC or RRC level signalling.

In an embodiment, apparatus 20 may be controlled by memory 24 and processor 22 to receive, from the network node, downlink reference signals (e.g., NZP-CSI-RS) or signal (e.g., SSB) to enable inter-antenna panel pathloss measurements at the apparatus 20. Alternatively, in an embodiment for sidelink communication, apparatus 20 may be controlled by memory 24 and processor 22 to receive, from another sidelink UE, uplink RS to enable the apparatus 20 to perform inter-antenna panel pathloss measurements.

According to certain embodiments, apparatus 20 may be controlled by memory 24 and processor 22 to compute initial UL TX power control value, $P_k$, for a target UL resource without any interference information. Then, by using the computed pathloss estimates, apparatus 20 may be controlled by memory 24 and processor 22 to compute pathloss power differences between target and candidate interference resources by subtracting the pathloss estimate of the target resource from the pathloss estimate of potential interference resource, e.g., as follows: $d_{(k,i)} = PL_i - PL_k$ where, $PL_k$ and $PL_i$ are pathloss power measurements for the k-th target and the i-th Interference leakage resource ($k \neq i$).

According to an embodiment, by using the pathloss power differences, apparatus 20 may be controlled by memory 24 and processor 22 to identify a dominant UL interferer by computing the maximum estimated pathloss power differences for the k-th target resource selected as: $\Delta_k = \text{Max} \{d_{(k,1)}, d_{(k,2)}, \ldots, d_{(k,I)}\}$, where the parameter I=K−1 and the parameter K defines the number of resources configured for simultaneous UL transmission. The maximum value may correspond to the beam-pair that may cause interference for the uplink reception.

In an embodiment, based on the maximum estimated pathloss difference, apparatus 20 may be controlled by memory 24 and processor 22 to determine the need for decreasing or increasing of the initial UL TX power value. In an embodiment, when the value of the maximum estimated pathloss power difference is larger than zero, apparatus 20 may be controlled by memory 24 and processor 22 to decrease initial UL TX power by the value of the maximum estimated pathloss difference. For example, if it is determined that the value of the power difference is larger than zero, i.e. $\Delta_k > 0$, then apparatus 20 may be controlled by memory 24 and processor 22 to decrease transmission power by the maximum power difference value as $P_k = P_k - \Delta_k$. As a result, uplink interference caused by the transmission of the target uplink resource can be mitigated.

In an embodiment, when the value of the maximum estimated pathloss power difference is less or equal to zero and apparatus 20 has TX power budget available, then apparatus 20 may be controlled by memory 24 and processor 22 to increase its TX UL power for the k-th target resource. In an embodiment, apparatus 20 may be controlled by memory 24 and processor 22 to compute the TX power increase by first selecting the minimum value out of the absolute of maximum pathloss difference value and network configured uplink TX power boost value ($\Delta^{network}_k \geq 0$). After this, apparatus 20 may be controlled by memory 24 and processor 22 to select an actual UE power control value by taking minimum among power increase of the initial power value and the total UL TX power budget. This operation may be mathematically summarized as follows: if ($\Delta_k \leq 0$ and ($\Sigma P_k < \text{PcTot}$, $\forall k$)), then $\Delta^{new}_k = \min(\text{abs}(\Delta_k), \Delta^{network}_k)$ and $P_k = \min(P_k + \Delta^{new}_k, \text{PcTot})$.

If the maximum estimated pathloss power difference is less or equal to zero and total aggregated (=sum) transmission power over different resources larger than the power budget of apparatus 20, apparatus 20 may be controlled by memory 24 and processor 22 to use the initial TX power control value.

In an embodiment, apparatus 20 may be controlled by memory 24 and processor 22 to repeat the above procedures for all targeted resources. Once UL power control values have been determined for all configured UL resources, apparatus 20 may be controlled by memory 24 and processor 22 to apply the computed power control values for resources configured for simultaneous uplink transmission over multiple antenna panels. According to one embodiment, apparatus 20 may be controlled by memory 24 and processor 22 to transmit, to the network node, simultaneously uplink RSs/PUSCH/PUCCH/PRACH with computed power control values via multiple antenna panels. As a result, uplink interference at gNB/TRP/sidelink UE receiver caused by simultaneous uplink multi-panel transmission can be minimized.

Therefore, certain example embodiments provide several technological improvements, enhancements, and/or advantages over existing technological processes and constitute an improvement at least to the technological field of wireless network control and management. For example, certain embodiments are able to mitigate uplink interference caused by simultaneous uplink multi-antenna panel transmission without extensive signaling information exchange between network and UE. Furthermore, if the UE has a power budget available, UL TX power can be boosted such that the impact of UL interference is minimized at gNB/TRP/sidelink UE receiver. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, or read-only memory, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

A first embodiment may be directed to a method that may include receiving, by a UE, reference signals and/or signal for performing inter-antenna panel pathloss power measurements, computing an initial uplink transmission power control value for a target uplink resource without any interference information. The method may also include computing pathloss power differences between the target uplink resource and candidate interference resources using the pathloss power measurements, and using the pathloss power differences to identify a dominant uplink interferer by computing the maximum estimated pathloss power difference. Based on the maximum estimated pathloss difference, the method may include determining whether there is a need to increase or decrease the initial uplink transmission power control value to compute uplink transmission power control value(s). The method may then include applying the computed uplink transmission power control value(s) for resources configured for simultaneous uplink transmission over multiple antenna panels.

In a variant, the computing of the pathloss power differences may comprise subtracting the pathloss estimate of the target resource from the pathloss estimate of the potential interference resource, for example, as follows: $d_{(k,i)}=PL_i-PL_k$, where $PL_k$ and $PL_i$ are pathloss power measurements for the k-th target and the i-th interference leakage resource.

In a variant, the dominant uplink interferer may be determined by computing the maximum estimated pathloss power differences for the k-th target resource as follows: $\Delta_k=\text{Max}\{d_{(k,1)}, d_{(k,2)}, \ldots, d_{(k,I)}\}$, where the parameter I=K−1 and the parameter K defines the number of resources configured for simultaneous uplink transmission.

In a variant, when the value of the maximum estimated pathloss power difference is larger than zero, the method may include decreasing the initial uplink transmission power by the value of the maximum estimated pathloss difference.

In a variant, when the value of the maximum estimated pathloss power difference is less than or equal to zero and the UE has transmission power budget available (e.g., total aggregated transmission power over different resources is less than the UE TX power budget (PcTot)), the method may include increasing the uplink transmission power for the target resource. According to a variant, the method may include computing the transmission power increase by first selecting the minimum value out of the absolute of maximum pathloss difference value and network configured uplink transmission power boost value ($\Delta^{network}_k \geq 0$), selecting an actual UE power control value by taking minimum among power increase of the initial transmission power control value and the total uplink transmission power budget.

In a variant, when the UE does not have transmission power budget available, the method may include using the initial uplink transmission power control value.

In a variant, when uplink transmission power control values have been determined for all configured uplink resources, the method may include applying the computed power control values for resources configured for simultaneous uplink transmission over multiple antenna panels. According to a variant, the method may also include transmitting, to a network node, simultaneously uplink RSs/PUSCH/PUCCH/PRACH with the computed uplink transmission power control values via multiple antenna panels.

A second embodiment is directed to an apparatus including at least one processor and at least one memory comprising computer program code. The at least one memory and computer program code may be configured, with the at least one processor, to cause the apparatus at least to perform the method according to the first embodiment and/or any other embodiments discussed herein, or any of the variants described above.

A third embodiment is directed to an apparatus that may include circuitry configured to perform the method according to the first embodiment and/or any other embodiments discussed herein, or any of the variants described above.

A fourth embodiment is directed to an apparatus that may include means for performing the method according to the first embodiment and/or any other embodiments discussed herein, or any of the variants described above.

A fifth embodiment is directed to a non-transitory computer readable medium comprising program instructions stored thereon for performing at least the method according to the first embodiment and/or any other embodiments discussed herein, or any of the variants described above.

What is claimed is:

1. A method, comprising:
receiving, by a user equipment, at least one signal for performing inter-antenna panel pathloss power measurements;
computing an initial uplink transmission power control value for a target uplink resource without any interference information;
computing pathloss power differences between the target uplink resource and candidate interference resources using the pathloss power measurements; and
using the pathloss power differences to identify a dominant uplink interferer by computing maximum estimated pathloss power differences.

2. The method according to claim 1, further comprising:
determining whether there is a need to increase or decrease the initial uplink transmission power control value to compute at least one uplink transmission power control value; and
applying the computed at least one uplink transmission power control value for resources configured for simultaneous uplink transmission over multiple antenna panels.

3. The method according to claim 1, wherein the computing of the pathloss power differences comprises subtracting a pathloss estimate of the target uplink resource from a pathloss estimate of a candidate interference resource.

4. The method according to claim 1, wherein the dominant uplink interferer is determined by computing the maximum estimated pathloss power differences for k-th target resource as follows: $\Delta k = \text{Max}\{d(k,1), d(k,2), \ldots, d(k,I)\}$, wherein parameter I=K−1 and parameter K defines number of resources configured for simultaneous uplink transmission.

5. The method according to claim 1, further comprising: decreasing the initial uplink transmission power by value of the maximum estimated pathloss power difference when the value of the maximum estimated pathloss power difference is larger than zero.

6. The method according to claim 1, further comprising: increasing the initial uplink transmission power for the target uplink resource when value of the maximum estimated pathloss power difference is less than or equal to zero and the user equipment has transmission power budget available.

7. The method according to claim 1, further comprising: computing a transmission power increase by first selecting a minimum value out of an absolute of maximum estimated pathloss power difference and a network configured uplink transmission power boost value; and
selecting a power control value by taking a minimum among a power increase of the initial uplink transmission power control value and a total uplink transmission power budget.

8. The method according to claim 1, further comprising: using the initial uplink transmission power control value when the user equipment does not have transmission power budget available.

9. The method according to claim 1, further comprising: applying computed power control values for resources configured for simultaneous uplink transmission over multiple antenna panels when the uplink transmission power control values have been determined for all configured uplink resources.

10. An apparatus, comprising:
at least one memory comprising computer program code;
at least one processor;
wherein the at least one memory and the computer program code are configured, with the at least one processor, to cause the apparatus at least to:
receive, by the apparatus, at least one signal for performing inter-antenna panel pathloss power measurements;
compute an initial uplink transmission power control value for a target uplink resource without any interference information;
compute pathloss power differences between the target uplink resource and candidate interference resources using the pathloss power measurements; and
use the pathloss power differences to identify a dominant uplink interferer by computing maximum estimated pathloss power differences.

11. The apparatus according to claim 10, wherein the at least one memory and the computer program code are configured, with the at least one processor, cause the apparatus at least to:
determine whether there is a need to increase or decrease the initial uplink transmission power control value to compute at least one uplink transmission power control value; and
apply computed at least one uplink transmission power control value for resources configured for simultaneous uplink transmission over multiple antenna panels.

12. The apparatus according to claim 10, wherein the computing of the pathloss power differences comprises subtracting a pathloss estimate of the target uplink resource from a pathloss estimate of a candidate interference resource.

13. The apparatus according to claim 10, wherein the dominant uplink interferer is determined by computing the maximum estimated pathloss power differences for k-th target resource as follows: $\Delta k = \text{Max}\{d(k,1), d(k,2), \ldots, d(k,I)\}$, wherein parameter I=K−1 and parameter K defines number of resources configured for simultaneous uplink transmission.

14. The apparatus according to claim 10, wherein the at least one memory and the computer program code are configured, with the at least one processor, cause the apparatus at least to:
decrease the initial uplink transmission power by value of the maximum estimated pathloss power difference when the value of the maximum estimated pathloss power difference is larger than zero.

15. The apparatus according to claim 10, wherein the at least one memory and the computer program code are configured, with the at least one processor, cause the apparatus at least to:
increase the initial uplink transmission power for the target uplink resource when value of the maximum estimated pathloss power difference is less than or equal to zero and the apparatus has transmission power budget available.

16. The apparatus according to claim 10, wherein the at least one memory and the computer program code are configured, with the at least one processor, cause the apparatus at least to:
compute a transmission power increase by first selecting a minimum value out of an absolute of maximum estimated pathloss power difference and a network configured uplink transmission power boost value; and
select a power control value by taking a minimum among a power increase of the initial uplink transmission power control value and a total uplink transmission power budget.

17. The apparatus according to claim 10, wherein the at least one memory and the computer program code are configured, with the at least one processor, cause the apparatus at least to:
use the initial uplink transmission power control value when the apparatus does not have transmission power budget available.

18. The apparatus according to claim 10, wherein the at least one memory and the computer program code are configured, with the at least one processor, cause the apparatus at least to:
apply computed uplink transmission power control values for resources configured for simultaneous uplink transmission over multiple antenna panels when the uplink transmission power control values have been determined for all configured uplink resources.

19. The apparatus according to claim 10, wherein the at least one memory and the computer program code are configured, with the at least one processor, cause the apparatus at least to:
transmit, to a network node, simultaneously at least one of the following with the computed uplink transmission power control values via multiple antenna panels: uplink reference signals, physical uplink shared channel, physical uplink control channel, and physical random access channel.

20. A non-transitory computer readable medium comprising program instructions stored thereon for performing at least:
receiving, by a user equipment, at least one signal for performing inter-antenna panel pathloss power measurements;

computing an initial uplink transmission power control value for a target uplink resource without any interference information;

computing pathloss power differences between the target uplink resource and candidate interference resources using the pathloss power measurements; and using the pathloss power differences to identify a dominant uplink interferer by computing maximum estimated pathloss power differences.

* * * * *